Patented Jan. 13, 1942

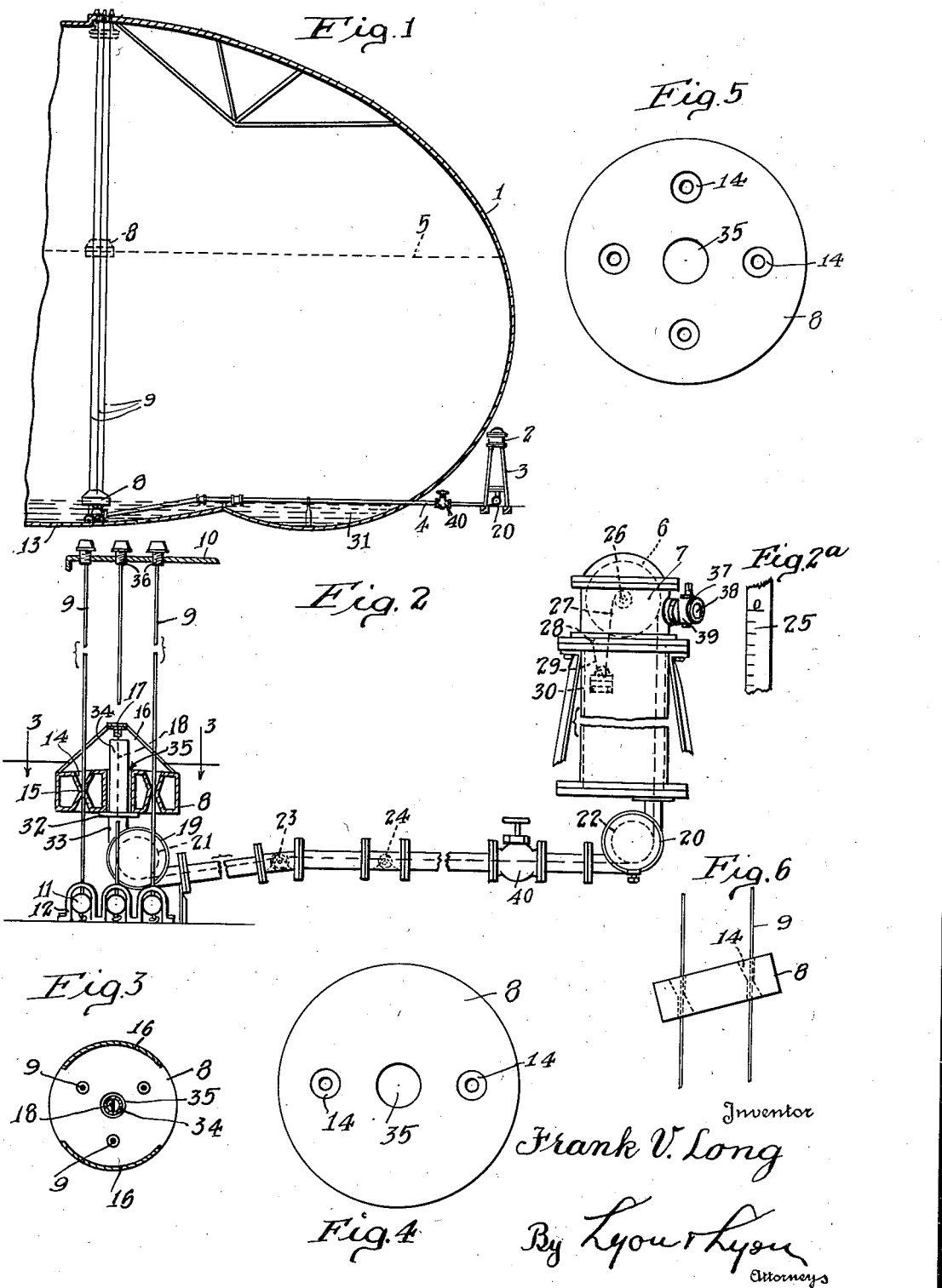

2,269,539

UNITED STATES PATENT OFFICE 2,269,539

GAUGE APPARATUS FOR LIQUID LEVELS

Frank V. Long, Compton, Calif.

Application April 6, 1938, Serial No. 200,374

3 Claims. (Cl. 73—321)

This invention relates to gauge apparatus for indicating liquid levels, and while the invention may be applicable in other situations, in the present specification it is described as applied to a tank of a large type such as employed as a container for oil, gasoline, or other liquids used commercially in large quantities.

The invention is particularly useful when applied to types of tanks which, in operation, withstand internal pressure; these pressures have a wide range. These tanks are frequently constructed of relatively thin plates, and with a rounding dome effect on their upper sides, which makes their upper sides somewhat inaccessible. Heretofore tanks have not usually been constructed with dome-shaped covers, and it has been the general practice to locate the reading stations for gauges on the tank roofs.

One of the objects of this invention is to provide a gauge apparatus in which the gauge indicator can be read from a point outside of the tank, and not necessarily on its roof. Usually a float is provided riding at the level of the liquid, and means is provided controlled by this float for indicating the depth of the liquid. Guiding means may be provided for the float. The liquid in these tanks is sometimes subjected to some turbulence, and there is a tendency for the floats to become tilted or cocked on their guides in such a way that the float might lock itself like a clutch on the guide members.

One of the objects of this invention is to overcome this difficulty and to provide a float of improved construction and capable of cooperating with such guide means in such a way that it is substantially impossible for the float to lock itself against free up and down movement with changes in the liquid level.

In operating tanks of this type, a common practice is to employ a quantity of water which has a higher specific gravity than oil or gasoline, and will not mix with it, at the tank bottom so that if any leaks occur at the bottom, only water will escape; but at the same time, the presence of water at the outside of the tank plating would indicate a leak and enable it to be repaired before any of the valuable oil or gasoline has been permitted to escape. This is also a safety precaution against accidental fires where the tank contains an inflammable substance such as gasoline or other inflammable hydrocarbon liquid. However, this practice gives rise to a difficulty in gauging the true depth of the oil or gasoline.

One of the objects of this invention is to overcome this difficulty and to provide a gauge apparatus which will indicate zero as the depth of the oil or gasoline when the float has descended to substantially the level of the water at the bottom of the tank, at which time the tank is virtually empty as regards its oil or gasoline content. The same may be applied to any tank containing any two liquid products of different specific gravity.

Previous types with an indicating box on the roof, give inaccurate readings because the tank roof rises and falls as internal pressure changes, or as the tank shell expands and contracts. There is also a safety factor in keeping the operators off the tanks; so a further object of the invention is to provide a gauge not affected by movement of the tank, and to permit reading the indicator at the ground.

Further objects of the invention will appear hereinafter.

The invention consists in the novel parts and combination of parts to be described hereinafter, all of which contribute to produce an efficient gauge apparatus for liquid levels.

A preferred embodiment of the invention is described in the following specification, while the broad scope of the invention is pointed out in the appended claims.

In the drawing:

Fig. 1 is a vertical section through the right-hand side of a tank, and illustrating my invention applied to the same.

Fig. 2 is a vertical section corresponding to Fig. 1, passing through the upper wall of the tank and passing through the float that controls the depth indicator, certain parts being broken away. This view is upon an enlarged scale.

Fig. 2a is a side elevation of a portion of an indicating tape broken away and indicating the reading at the gauge of the indicator that corresponds to the position of the float illustrated in Fig. 2.

Fig. 3 is a horizontal section taken about on the line 3—3 of Fig. 2, and further illustrating the embodiment of the float shown in Fig. 2.

Fig. 4 is a view similar to Fig. 3, but illustrating upon an enlarged scale another type of float in which only two guide members or guide wires are employed, instead of three as in Fig. 3.

Fig. 5 is another view similar to Fig. 4, but illustrating another embodiment of the float in which four guide members or wires are employed.

Fig. 6 is an elevation of the float showing the guide openings of hour-glass form therein and the manner in which such openings permit tilting of the float.

Before proceeding to a more detailed description of the invention, it should be stated that in the present specification the invention is described as applied to a tank for holding a more or less volatile liquid such as gasoline, and in which the gas pressure above the liquid level may attain some pressure in the tank, which is a closed tank.

Although it has been customary heretofore to take gauge readings at the tank cover, the closed tanks now in use usually are rounded or dome-shaped above, so that it would be difficult for a gauge reader to climb to the top of the tank in order to read the gauge. In accordance with my invention, I provide means whereby the gauge reading may be taken alongside the tank and at or about the ground level, although, of course, if desired to provide for a different location of the gauge indicator, it may be located in the usual position over the tank.

Although any suitable means may be employed for controlling the gauge or depth indicator, in the present instance I employ a float that floats on the surface of the liquid, and means is provided connecting this float through the wall of the tank for operating the gauge or indicator. In accordance with my invention, I construct the float so that the accuracy of the reading at the indicator will not be substantially affected by rocking or tilting of the float due to turbulence of the surface of the liquid.

Where water or other liquid of higher specific gravity than the liquid contained in the tank is employed, my apparatus is constructed in such a way that the gauge will indicate the depth of the liquid such as gasoline measured from the lower surface of the gasoline; in other words, so that when the tank is substantially empty of gasoline and the float is at the level of the water at the bottom of the tank, the gauge will indicate zero. As tanks of this kind are under a slight pressure, the indicator housing or "box" is constructed so that it will withstand this pressure, and is also constructed so that the gauge or indicating scale may be read from the exterior without opening the indicator box. Improvements in the specific construction of the indicator housing or indicating box, are covered by a separate application.

In practicing my invention, in the tank 1, having the general form illustrated in Fig. 1, I provide an indicator housing or indicator box 2 at the exterior of the tank and preferably at or about the ground level. This indicator housing may be supported on a small stand or frame 3, which will support it at a convenient height for reading. The indicator housing is preferably of tubular form so that it forms a closed chamber within the same, and this chamber is in communication with the interior of the tank 1 through a duct 4, said duct being preferably constructed of piping, as indicated.

Within the tank suitable means is provided controlled by the liquid level 5 for controlling indicating means or an indicator 6 located in the super casing or closed head 7 of the indicator housing. In the present instance, I have illustrated a float 8 for controlling the movements of the indicator 6 through changes of the liquid level 5. This float is preferably in the form of a hollow buoyant body, which is guided to move in a substantially vertical direction when the liquid level rises or falls. In order to accomplish this, I prefer to provide one or more guide members 9, which preferably consist of wires anchored in a top plate 10 of the tank, and hanging downwardly. These wires are provided with means for maintaining them taut under all working conditions of the tank, and in order to accomplish this, I prefer to attach a weight that may be in the form of a ball 11, to the lower end of each wire, said balls being guided in suitable cages 12 respectively, that are attached to the tank bottom 13.

In order to guide the float 8 on the guide members or wires 9, I prefer to provide it with eyes through which the wires pass, the construction being such as to permit the float to tilt without binding on the wires. In order to accomplish this, I prefer to provide the float with guide eyes or openings 14, which have their smallest diameter at an intermediate point on the height of the float, and have their maximum diameter at the upper and lower faces of the float. In other words, I give these guide openings an hour-glass form. This form of opening enables the float to tilt considerably without binding, as illustrated in Fig. 6. At the same time, while the float is tilted in this way, its central point will be at a level that will correspond fairly accurately to the real level of the liquid.

The float is preferably provided with an upper frame 16, the center 17 of which is located on the vertical axis of the float, and at this point I attach a flexible connection 18 such as a wire or metallic tape, which is guided through the duct 4 up to the indicator 6. For this purpose the duct is provided with special fittings 19 and 20, in which guide sheaves 21 and 22 are located, over which the flexible connection or tape passes. At other points in the duct 4 the carrier pulleys 23 and 24 may be provided, as indicated in Fig. 2. The indicator 6 may be of any suitable construction, but preferably consists of a wheel or pulley on which a gauge tape 25 wraps. This gauge tape 25 may be, if desired, the same piece as the flexible connection 18, but this is not essential. The indicator wheel 6 is constrained by suitable means, in a direction to wrap up the gauge tape upon it. In the present instance, for this purpose I have indicated the shaft of the gauge wheel as provided with a pulley or roll 26, over which a wire or cord 27 may wrap, the said cord being anchored at its other end at a point 28, and hanging down in a loop 29 that carries a suitable weight 30 suspended on a small pulley (not illustrated).

If a quantity of water 31 is carried at the bottom of the tank, I provide means for arresting the descent of the float 8 at or about the level of the upper surface of the water, and for this purpose I prefer to provide the rest 32, which may be in the form of a disc, rigidly secured to a sleeve 33 that extends up from a special fitting 19 that carries the guide sheave 21. The upper portion of the sleeve 33 operates as a nipple or thimble 34 that lies within a larger central opening 35 in the float. The upper end of this thimble is a considerable distance above the level of the upper surface of the water 31. It therefore functions to exclude water from the duct 4 and from the communicating indicator box 2. The indicator or gauge 6 is constructed and adjusted so that when the float 8 is on the rest 32, the indicator will give a reading of zero. This is indicated in Fig. 2a where a portion of the scale or tape 25 is indicated broken away.

Any number of guide wires 9 may be employed. In Figs. 2 and 3 I have illustrated the use of three of these guide wires, but in Fig. 4 I have illustrated the use of only two of these wires. Fig. 5 illustrates a construction for the float involving the use of as many as four of such guide wires.

The upper end of the guide wires 9 may, if desired, be supported in adjustable bushings 36 threaded into the cover plate 10 of the tank.

The indicator box 7 is constructed in such a way as to enable the gauge tape or other indicating scale to be seen from the outside. This means consists of two tubular branch fittings 37, making an angle of about 90° to each other and projecting outwardly from the casing at about the level of the reading point. These fittings are provided with liquid-tight stout glass discs such as the disc 38, which is sufficiently strong to retain the pressure existing in the tank. These fittings are provided with plug cocks 39, which are in open position when the reading is being taken, but which are closed at other times. These plug cocks can be closed very quickly, and are very advantageous when used in this connection, because if either of the glass discs 38 becomes broken accidentally, the flow of gasoline through the same can be immediately turned off. However, if desired, the duct or pipe line 4 leading to the indicating mechanism, may be provided with a valve 40 near the indicating mechanism, and between it and the side of the tank.

It is understood that the embodiment of the invention described herein is only one of the many embodiments this invention may take, and I do not wish to be limited in the practice of the invention, nor in the claims, to the particular embodiment set forth.

What I claim is:

1. In apparatus including a tank carrying two non-miscible liquids of different specific gravities, the combination of a float within the tank to indicate the true level of the upper liquid, an indicator box with indicating means therein controlled by said float, said indicating means having graduations to substantially indicate zero when the float is located substantially at the upper surface of the lower liquid, a guide nipple for the indicating means located in the tank at about the level of the lower liquid, means for guiding the float as it descends, to a point adjacent to the nipple, and a rest for supporting the float adjacent the nipple.

2. In apparatus including a tank carrying two non-miscible liquids of different specific gravities, the combination of a float within the tank to indicate the true level of the upper liquid, an indicator box with indicating means therein controlled by said float, said indicating means having graduations to substantially indicate zero when the float is located substantially at the upper surface of the lower liquid, a guide nipple located in the tank at about the level of the lower liquid, means for guiding the float as it descends, to a point adjacent to the nipple, a rest for supporting the float adjacent the nipple, said nipple being open at its upper end, said float having a hanger located above the nipple when the float is on the rest, and a flexible connection attached to said hanger guided through said guide nipple and connected to the indicating means for actuating the same.

3. In apparatus of the kind described, the combination of a closed tank for a liquid, a float resting on the surface of the liquid, said float having a body with a plurality of openings therethrough operating as guide eyes, a plurality of flexible guide members suspended from above, passing down through said guide eyes respectively, tension means for the guide members, including weights attached to the lower ends of the guide members, and fixed guides for the weights, indicating means outside of the tank, for indicating the liquid depth, and means connecting the same with said float.

FRANK V. LONG.